United States Patent
Cooper et al.

(10) Patent No.: US 8,904,228 B2
(45) Date of Patent: Dec. 2, 2014

(54) METHODS AND SYSTEMS FOR REPAIRING MEMORY

(75) Inventors: Stephen Ray Cooper, Georgetown, TX (US); Bryan James Thornley, Burnet, TX (US)

(73) Assignee: Dell Products L.P., Round Rock, TX (US)

(*) Notice: Subject to any disclaimer, the term of this patent is extended or adjusted under 35 U.S.C. 154(b) by 316 days.

(21) Appl. No.: 13/313,898

(22) Filed: Dec. 7, 2011

(65) Prior Publication Data
US 2013/0151890 A1   Jun. 13, 2013

(51) Int. Cl.
*G06F 11/00* (2006.01)

(52) U.S. Cl.
USPC ............ 714/6.13; 714/6.1; 714/6.11; 714/36; 714/42

(58) Field of Classification Search
USPC ............. 714/6.1, 6.11, 6.13, 36, 42, 47.1, 48; 713/1, 2
See application file for complete search history.

(56) References Cited

U.S. PATENT DOCUMENTS

| | | | |
|---|---|---|---|
| 7,783,919 B2 | 8/2010 | Khatri et al. | 714/8 |
| 7,949,913 B2 | 5/2011 | Norrod et al. | 714/723 |
| 2005/0050402 A1* | 3/2005 | Koda et al. | 714/42 |
| 2005/0188288 A1* | 8/2005 | Larson et al. | 714/718 |
| 2008/0313495 A1* | 12/2008 | Huff | 714/8 |
| 2009/0049257 A1 | 2/2009 | Khatri et al. | 711/161 |
| 2009/0161430 A1* | 6/2009 | Allen et al. | 365/185.09 |
| 2009/0210689 A1* | 8/2009 | Harmer | 713/2 |
| 2010/0251044 A1* | 9/2010 | Khatri et al. | 714/723 |

FOREIGN PATENT DOCUMENTS

| | | | | |
|---|---|---|---|---|
| CN | 101369245 | 2/2009 | | G06F 11/22 |
| CN | 101369247 | 2/2009 | | G06F 11/22 |
| EP | 2026356 | 8/2008 | | G11C 29/44 |
| EP | 2026355 | 2/2009 | | G11C 29/44 |
| SG | 150448 | 3/2009 | | G11C 29/808 |
| SG | 150449 | 3/2009 | | G11C 29/20 |
| TW | 200912644 | 3/2009 | | G06F 11/16 |
| TW | 200917262 | 4/2009 | | G11C 17/18 |

* cited by examiner

*Primary Examiner* — Joseph D Manoskey
(74) *Attorney, Agent, or Firm* — Baker Botts L.L.P.

(57) ABSTRACT

In accordance with embodiments of the present disclosure, a method may comprise identifying one or more portions of the memory having defects. The method may also include storing one or more addresses in the memory defect list, each of the one or more addresses associated with a portion of the one or more identified portions. The method may further include indicating to components of an information handling system that the one or more identified portions are unusable such that the other components are prevented from allocating and using the one or more identified portions.

18 Claims, 1 Drawing Sheet

METHODS AND SYSTEMS FOR REPAIRING MEMORY

TECHNICAL FIELD

The present disclosure relates in general to information handling systems, and more particularly to memory repair in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems employ memories to store instructions and data. From time to time, certain portions of such memories may acquire a defect, making such portions unusable. Traditionally, the occurrence of such defects required replacement of such memory, which may be costly in terms of labor and hardware, as well as system downtime. More recent approaches to such failures and defects have included the use of error correction code (ECC memory) or recording of defective memory portions within memory modules (e.g., a serial presence detect or other memory on a dual inline memory modules or "DIMMs"), which require significant logic and/or software complexity and significant cost to implement.

SUMMARY

In accordance with the teachings of the present disclosure, the disadvantages and problems associated with memory failures have been reduced or eliminated.

In accordance with embodiments of the present disclosure, an information handling system may include a processor, a memory communicatively coupled to the processor, a memory defect list embodied on a non-volatile computer-readable medium and configured to include a list of one or more addresses of the memory that include a defect, and a memory agent comprising one or more instructions embodied on a computer-readable medium. The one or more instructions may, when read and executed, cause the processor to: identify one or more portions of the memory having defects; store one or more addresses in the memory defect list, each of the one or more addresses associated with a portion of the one or more identified portions; and indicate to other components of the information handling system that the one or more identified portions are unusable such that the other components are prevented from allocating and using the one or more identified portions.

In accordance with other embodiments of the present disclosure, a method may comprise identifying one or more portions of the memory having defects. The method may also include storing one or more addresses in the memory defect list, each of the one or more addresses associated with a portion of the one or more identified portions. The method may further include indicating to components of an information handling system that the one or more identified portions are unusable such that the other components are prevented from allocating and using the one or more identified portions.

In further embodiments of the present disclosure, an article of manufacture, may include a computer readable medium and computer-executable instructions carried on the computer readable medium, the instructions readable by a processor. The instructions, when read and executed, may cause the processor to: identify one or more portions of the memory having defects; store one or more addresses in the memory defect list, each of the one or more addresses associated with a portion of the one or more identified portions; and indicate to components of an information handling system that the one or more identified portions are unusable such that the other components are prevented from allocating and using the one or more identified portions.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
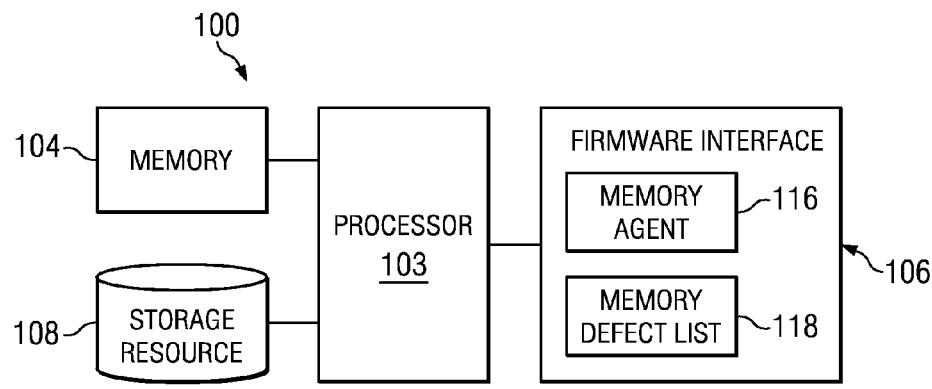
FIG. 1 illustrates a block diagram of an example information handling system, in accordance with certain embodiments of the present disclosure.
Figure 2:
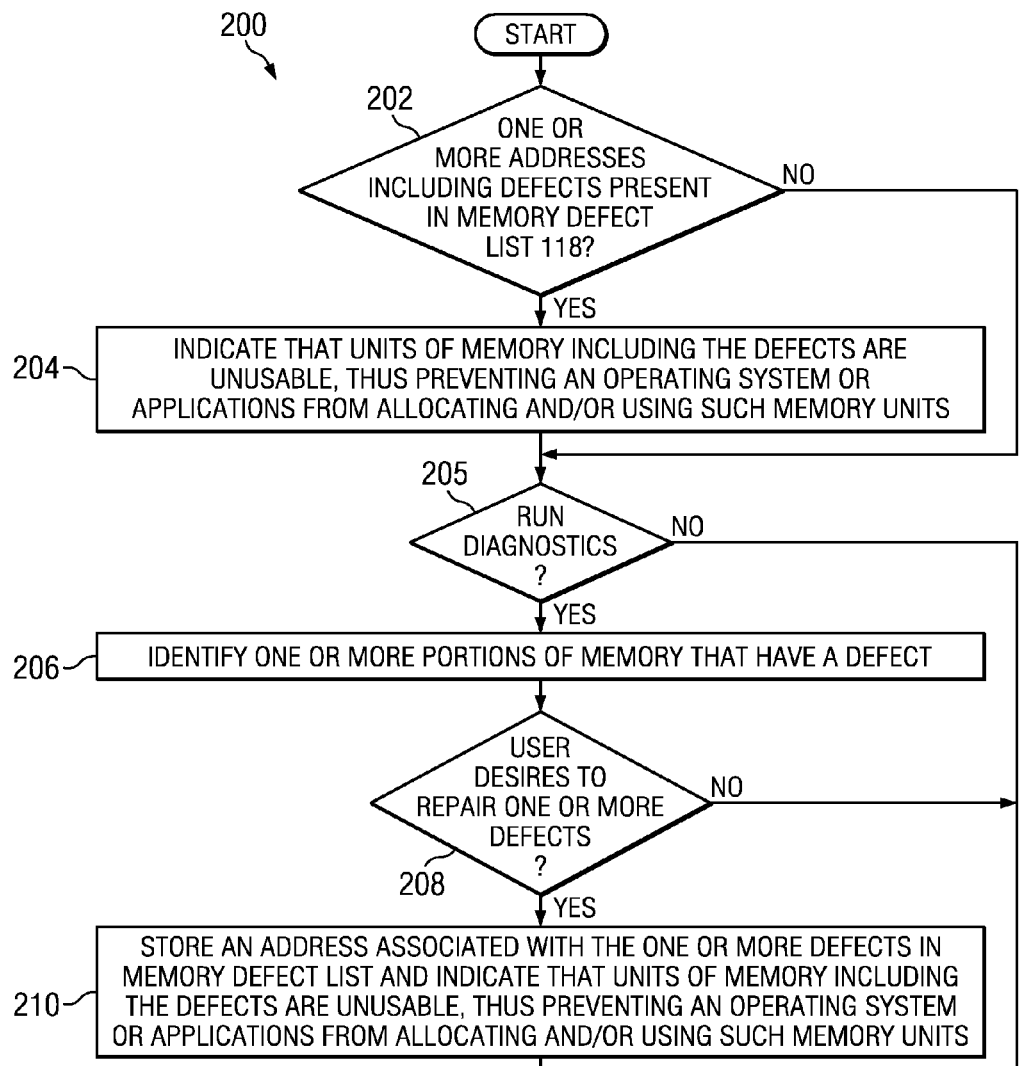
FIG. 2 illustrates a flow chart of an example method for information assurance and supply chain security in an information handling system, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates a block diagram of an example information handling system 100, in accordance with certain embodiments of the present disclosure. In certain embodiments, information handling system 100 may be a server. In another embodiment, information handling system 100 may be a personal computer (e.g., a desktop computer or a portable computer). As depicted in FIG. 1, information handling system 100 may include a processor 103, a memory 104 communicatively coupled to processor 103, firmware interface 106 communicatively coupled to processor 103, and a storage resource 108 communicatively coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, firmware interface 106 storage resource 108, and/or another component of information handling system 100.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 100 is turned off.

Firmware interface 106 may be communicatively coupled to processor 103 and may include any system, device, or apparatus configured to identify, test, and/or initialize information handling resources of information handling system 100. In some embodiments, firmware interface 106 may comprise a basic input/output system (BIOS). In other embodiments, firmware interface 106 may comprise a Unified Extensible Firmware Interface (UEFI). In some embodiments, firmware interface 106 may be implemented in a computer-readable medium (e.g., a read-only memory) as a program of instructions that may be read by and executed on processor 103 to carry out the functionality of firmware interface 106. In these and other embodiments, firmware interface 106 may comprise boot firmware configured to be the first code executed by processor 103 when information handling system 100 is booted and/or powered on. As part of its initialization functionality, firmware interface 106 may be configured to set components of information handling system 100 into a known state, so that one or more applications (e.g., an operating system or other application programs) stored on compatible media (e.g., memory 104) may be executed by processor 103 and given control of information handling system 100.

As depicted in FIG. 1, firmware interface 106 may have stored thereon a memory agent 116 and a memory defect list 118. Memory agent 116 may include any system, device, or apparatus configured to detect and repair defects (e.g., physical errors or failures) within memory 104 and repair such defects, as further described in this disclosure. In some embodiments, memory agent 116 may be implemented as a program of instructions that may be read from firmware interface 106 by processor 103 and executed by processor 103 to carry out the functionality of memory agent 116. Although memory agent 116 is shown in FIG. 1 to be an integral component of firmware interface 106, in some embodiments, memory agent 116 may be integral to other components of information handling system 100 (e.g., memory agent 116 may be an application or a component of an operating system stored on storage resource 108 and executed by such operating system in addition to or in lieu of execution by firmware interface 106).

Memory defect list 118 may include any file, table, list, database, and/or other data structure having stored thereon identifying information (e.g., physical addresses) for portions of memory 104 (e.g., blocks, pages, etc.) determined by memory agent 116 to have a defect, as further described in this disclosure. In certain embodiments, memory defect list 118 may be stored in a non-volatile computer-readable medium associated with firmware interface 106 (e.g., an electrically-erasable programmable read only memory, a solid state storage device, etc.). Although memory defect list 118 is shown in FIG. 1 to be an integral component of firmware interface 106, in some embodiments, memory defect list 118 may be integral to other components of information handling system 100 (e.g., may be stored in a non-volatile computer-readable medium accessible to firmware interface 106 or stored on storage resource 108).

Storage resource 108 may comprise computer-readable media (e.g., hard disk drive, floppy disk drive, CD-ROM, and/or other type of rotating storage media, flash memory, EEPROM, and/or other type of solid state storage media) and may be generally operable to store data and retain data even after power is withdrawn to information handling system 100.

FIG. 2 illustrates a flow chart of an example method 200 for identifying memory defects and repairing defective memory, in accordance with certain embodiments of the present disclosure. According to one embodiment, method 200 may begin at step 202. As noted above, teachings of the present disclosure may be implemented in a variety of configurations of information handling system 100. As such, the preferred initialization point for method 200 and the order of the steps 202-210 comprising method 200 may depend on the implementation chosen.

At step 202, upon initialization of memory agent 116, memory agent 116 may determine whether one or more addresses identifying locations of one or more defects are present in memory defect list 118. If one or more addresses appear in memory defect list 118, method 200 may proceed to step 204. Otherwise, method 200 may proceed to step 206.

At step 204, in response to determining that one or more addresses identifying locations of one or more defects are present in memory defect list 118, memory agent 116 may indicate (e.g., to other components of information handling system 100, such as an operating system, for example) that the one or more units of memory including the defects (e.g., a memory block or memory page) are unusable, thus preventing an operating system or applications from allocating and/or using such memory units.

At step 206, memory agent 116 may perform memory diagnostics or other testing of memory 104 to identify portions (e.g., blocks, pages, etc.) of memory 104 that have a defect. In embodiments in which memory agent 116 resides within firmware interface 106, such defect identification may occur upon boot of information handling system 100. In embodiments in which memory agent 116 is an application or operating system residing on storage resource 108, memory agent 116 may identify defects upon initialization of such operating system or application and/or may continually identify defects during execution. Execution of memory agent 116 may occur prior to delivery of information handling system 100 to a customer or other intended end user (e.g., so that memory defects may be identified during manufacturing and/or prior to delivery) and/or after delivery to a customer or other end user.

At step 208, in response to identifying one or more addresses of memory having a defect, memory agent 116 may, in some embodiments, prompt a user of information handling system 100 (e.g., via a display or other user interface) regarding whether the user desires that memory agent 116 repair the one or more defects. If a user indicates a desire to repair one or more defects, method 200 may proceed to step 210. Otherwise, method 200 may end.

At step 210, in response to user confirmation to repair one or more defects (or in response to identification of the defect in embodiments in which a user is not queried regarding whether to repair a defect), memory agent 116 may store an address associated with the one or more defects in memory defect list 118 (e.g., a physical address associated with a block. In addition, memory agent 116 may indicate (e.g., to other components of information handling system 100, such as an operating system, for example) that one or more units of memory including the defects (e.g., a memory block or memory page) are unusable, thus preventing an operating system or applications from allocating and/or using such memory units. After completion of step 210, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Upon subsequent execution of method 200 (e.g., after a subsequent boot of information handling system 100 or initialization of memory agent 116) memory agent may indicate that portions of memory 104 identified as having defects during the most recent execution of memory agent 116 and during previous executions of memory agent 116 are unusable, such that such portions of memory are not allocated or used by an application or operating system.

Method 200 may be implemented using information handling system 100 or any other system operable to implement method 200. In certain embodiments, method 200 may be implemented partially or fully in software and/or firmware embodied in computer-readable media.

As a result of the methods and systems disclosed herein, memory agent 116 may indicate that defective memory is unusable, such that the defective memory cannot be allocated by software. In many cases, the portion of memory indicated as unusable may be small relative to the overall capacity of the memory, such that the reduction in available memory capacity may be negligible (e.g., rendering a 4 kilobyte block unusable in a 4 gigabyte memory causes a one one-millionth reduction in memory capacity). In addition, memory identification and repair may be undertaken without the need for error correction code (ECC) memory or a memory controller operable to maintain ECC memory or identify a memory module (e.g., DIMM) having the defect. In addition, the methods and systems disclosed herein may not require DIMM isolation capability or storing information regarding a DIMM having the defect on the DIMM (e.g., on a serial presence detect of the DIMM).

Although the present disclosure has been described in detail, it should be understood that various changes, substitutions, and alterations can be made hereto without departing from the spirit and the scope of the disclosure as defined by the appended claims.

What is claimed is:

1. An information handling system comprising:
a processor;
a memory communicatively coupled to the processor;
a memory defect list embodied on a non-volatile computer-readable medium and configured to include a list of one or more physical addresses of the memory that include a defect;
a memory agent comprising one or more instructions embodied on a computer-readable medium, the one or more instructions, when read and executed, for causing the processor to:
identify one or more portions of the memory having defects;
store one or more physical addresses in the memory defect list, each of the one or more addresses associated with a portion of the one or more identified portions; and
indicate to other components of the information handling system that the one or more identified portions are unusable such that the other components are prevented from allocating and using the one or more identified portions.

2. An information handling system according to claim 1, the memory agent further for causing the processor to, upon a subsequent execution of the memory agent:
determine if one or more physical addresses are present in the memory defect list; and
indicate to other components of the information handling system that portions of memory associated with the one or more physical addresses present in the memory defect list are unusable such that the other components are prevented from allocating and using such portions.

3. An information handling system according to claim 1, further comprising a firmware interface, the firmware interface having stored thereon at least one of the memory defect list and the memory agent.

4. An information handling system according to claim 3, the firmware interface comprising a basic input/output system.

5. An information handling system according to claim 3, the firmware interface comprising a Unified Extensible Firmware Interface (UEFI).

6. An information handling system according to claim 1, further comprising a storage resource, the storage resource having stored thereon at least one of the memory defect list and the memory agent.

7. A method comprising, during a first execution of a memory agent:
identifying one or more portions of a memory having defects;

storing one or more physical addresses in a memory defect list embodied on a non-volatile computer-readable medium, each of the one or more physical addresses associated with a portion of the one or more identified portions; and indicating to components of an information handling system that the one or more identified portions are unusable such that the other components are prevented from allocating and using the one or more identified portions.

8. A method according to claim 7, further comprising during a second execution of the memory agent subsequent to the first execution:

determining if one or more physical addresses are present in the memory defect list; and indicating to components of the information handling system that portions of memory associated with the one or more physical addresses present in the memory defect list are unusable such that the other components are prevented from allocating and using such portions.

9. A method according to claim 7, wherein the memory agent is integral to a firmware interface.

10. A method according to claim 9, wherein the memory defect list is integral to the firmware interface.

11. A method according to claim 9, the firmware interface comprising a basic input/output system.

12. A method according to claim 9, the firmware interface comprising a Unified Extensible Firmware Interface (UEFI).

13. An article of manufacture, comprising:

a non-transitory computer readable storage medium; and computer-executable instructions carried on the non-transitory computer readable storage medium, the instructions readable by a processor, the instructions, when read and executed, for causing the processor to, during a first execution of the computer-readable instructions:

identify one or more portions of a memory having defects;

store one or more physical addresses in a memory defect list embodied on a non-volatile computer-readable medium, each of the one or more physical addresses associated with a portion of the one or more identified portions; and indicate to components of an information handling system that the one or more identified portions are unusable such that the other components are prevented from allocating and using the one or more identified portions.

14. An article of manufacture according to claim 13, the instructions further for causing the processor to, upon a second execution of the instructions subsequent to the first execution:

determine if one or more physical addresses are present in the memory defect list; and indicate to components of the information handling system that portions of memory associated with the one or more physical addresses present in the memory defect list are unusable such that the other components are prevented from allocating and using such portions.

15. An article of manufacture according to claim 13, wherein the memory agent is integral to a firmware interface.

16. An article of manufacture according to claim 15, wherein the memory defect list is integral to the firmware interface.

17. An article of manufacture according to claim 15, the firmware interface comprising a basic input/output system.

18. An article of manufacture according to claim 15, the firmware interface comprising a Unified Extensible Firmware Interface (UEFI).

* * * * *